US011523397B2

(12) United States Patent
Tang

(10) Patent No.: US 11,523,397 B2
(45) Date of Patent: Dec. 6, 2022

(54) INFORMATION TRANSMISSION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 37 days.

(21) Appl. No.: 16/909,565

(22) Filed: Jun. 23, 2020

(65) Prior Publication Data
US 2020/0359385 A1 Nov. 12, 2020

Related U.S. Application Data

(63) Continuation of application No. PCT/CN2017/118399, filed on Dec. 25, 2017.

(51) Int. Cl.
*H04W 4/00* (2018.01)
*H04W 72/04* (2009.01)
(Continued)

(52) U.S. Cl.
CPC ...... *H04W 72/0493* (2013.01); *H04B 7/0617* (2013.01); *H04B 7/0626* (2013.01);
(Continued)

(58) Field of Classification Search
None
See application file for complete search history.

(56) References Cited

U.S. PATENT DOCUMENTS 9,439,179 B2 * 9/2016 Lu .................... H04L 5/0094
9,918,341 B2    3/2018 Papaleo et al.
(Continued)

FOREIGN PATENT DOCUMENTS

CN   101502032 A   8/2009
CN   105991211 A   10/2016
(Continued)

OTHER PUBLICATIONS

International Search Report in the international application No. PCT/CN2017/118399, dated Aug. 31, 2018.
(Continued)

*Primary Examiner* — Zewdu A Beyen
(74) *Attorney, Agent, or Firm* — Ladas & Parry LLP

(57) ABSTRACT

An information transmission method, a terminal device and a network device are provided. The method is applied to a communication system including a network device and a terminal device, and a frequency-domain resource on a carrier used by the communication system is a contention based frequency-domain resource. The method including: the network device determining an available first time-frequency resource and sending first information to the terminal device through the first time-frequency resource; the terminal device receiving first information from the network device through a first time-frequency resource, where the first time-frequency resource is a time-frequency resource in a first downlink transmission burst; and the terminal device determining, according to the first information, that the first time-frequency resource is a downlink time-frequency resource.

14 Claims, 5 Drawing Sheets

(51) Int. Cl.
*H04W 76/11* (2018.01)
*H04B 7/06* (2006.01)
*H04L 5/00* (2006.01)

(52) U.S. Cl.
CPC ......... *H04L 5/0051* (2013.01); *H04W 72/042* (2013.01); *H04W 72/0446* (2013.01); *H04W 72/0453* (2013.01); *H04W 76/11* (2018.02)

(56) References Cited

U.S. PATENT DOCUMENTS

| | | | |
|---|---|---|---|
| 2011/0243080 A1 | 10/2011 | Chen | |
| 2011/0286402 A1 | 11/2011 | Gong | |
| 2012/0120912 A1 | 5/2012 | Lu | |
| 2014/0064216 A1* | 3/2014 | Agiwal | H04L 1/0031 370/329 |
| 2016/0345360 A1 | 11/2016 | Papaleo et al. | |
| 2017/0019909 A1 | 1/2017 | Si et al. | |
| 2017/0171887 A1 | 6/2017 | Shi et al. | |
| 2018/0007708 A1* | 1/2018 | Ke | H04L 27/0006 |
| 2018/0206226 A1* | 7/2018 | Zeng | H04W 72/0446 |
| 2019/0037565 A1 | 1/2019 | Zheng et al. | |

FOREIGN PATENT DOCUMENTS

| | | |
|---|---|---|
| WO | 2016152005 A1 | 9/2016 |
| WO | 2016191134 A1 | 12/2016 |
| WO | 2017010799 A1 | 1/2017 |
| WO | 2017020293 A1 | 2/2017 |
| WO | 2017083514 A1 | 5/2017 |
| WO | 2017166276 A1 | 10/2017 |
| WO | 2017196612 A1 | 11/2017 |
| WO | 2017211682 A1 | 12/2017 |

OTHER PUBLICATIONS

3GPP TSG RAN Meeting #77 RP-172021, "Revised SID on NR-based Access to Unlicensed Spectrum", Qualcomm Incorporated, Sapporo, Japan, Sep. 11-14, 2017.
Written Opinion of the International Search Authority in the international application No. PCT/CN2017/118399, dated Aug. 31, 2018.
Supplementary European Search Report in the European application No. 17936074.8, dated Nov. 13, 2020.
Office Action of the Indian application No. 202027030901, dated Nov. 11, 2021.
First Office Action of the Japanese application No. 2020-554335, dated Nov. 16, 2021.
First Office Action of the Chinese application No. 202110247103.8, dated Jun. 1, 2022.
European Search Report in the European application No. 21214374.7, dated Mar. 30, 2022.
Huawei, HiSilicon, "NR frame structure on unlicensed bands", 3GPP TSG RAN WG1 Meeting #91 R1-1719840, Reno, USA, Nov. 27-Dec. 1, 2017.
Coolpad, "Considerations on NR-based Access to Unlicensed Spectrum", 3GPP TSG RAN WG1 Meeting 91 R1-1720602, Reno, USA, Nov. 27-Dec. 1, 2017.
First Office Action of the Korean application No. 10-2020-7021724, dated Sep. 26, 2022.
Notice of Allowance of the Chinese application No. 202110247103.8, dated Sep. 7, 2022.

* cited by examiner

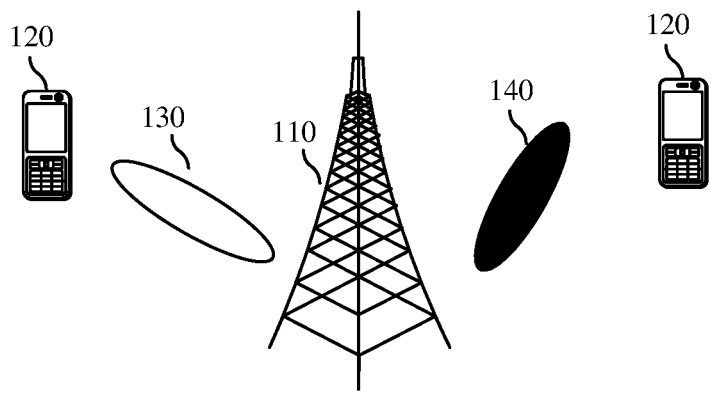

| S201 | A network device determines an available first time-frequency resource, the first time-frequency resource being a time-frequency resource in a first downlink transmission opportunity |

| S202 | The network device sends first information to a terminal device through the first time-frequency resource, the first information being used by the terminal device to determine that the first time-frequency resource is a downlink time-frequency resource, the first information being further used to determine an ending position of the first downlink transmission opportunity and the first information being information obtained by first beam forming processing |

FIG. 2

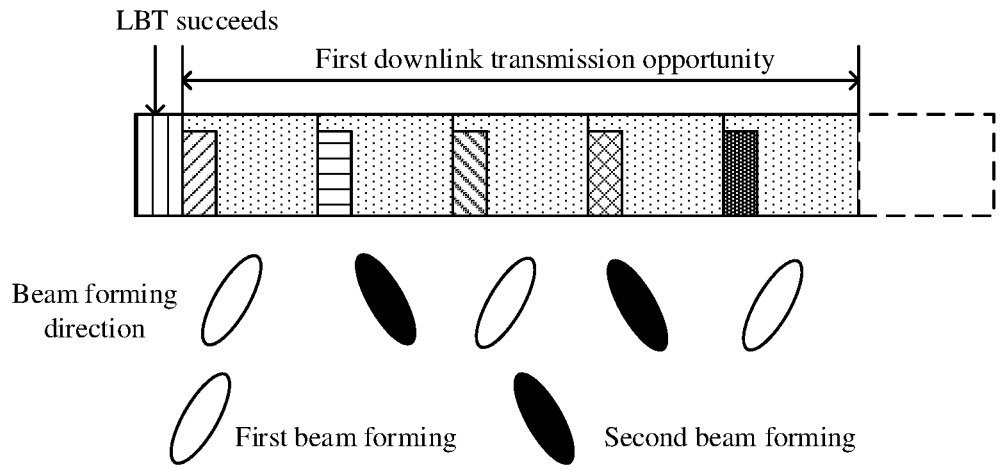

| S601: A terminal device receives first information from the network device through a first time-frequency resource, the first time-frequency resource being a time-frequency resource in a first downlink transmission opportunity |

| S602: The terminal device determines, according to the first information, that the first time-frequency resource is a downlink time-frequency resource, the first information being further used to determine an ending position of the first downlink transmission opportunity and the first information being information obtained by first beam forming processing |

FIG. 6

INFORMATION TRANSMISSION METHOD, NETWORK DEVICE, AND TERMINAL DEVICE

CROSS REFERENCE TO RELATED APPLICATION

This application is a continuation of International Patent Application No. PCT/CN2017/118399 filed on Dec. 25, 2017, the disclosure of which is hereby incorporated by reference in its entirety.

BACKGROUND

In a Licensed-Assisted Access using Long Term Evolution (LAA-LTE) system, service is provided for a terminal device by using a carrier on a licensed spectrum as a primary carrier and a carrier on an unlicensed spectrum as a secondary carrier. A communication device follows a "Listen Before Talk (LBT)" principle on an unlicensed spectrum, namely the communication device, before sending a signal in a channel of the unlicensed spectrum, needs to monitor the channel at first. The communication device may send the signal only when a channel monitoring result is that the channel is idle, and if the channel monitoring result of the communication device for the channel of the unlicensed spectrum is that the channel is busy, the communication device may not send the signal.

In the LAA-LTE system, transmission of a network device is opportunistic, data may be transmitted only when LBT succeeds and no data may be transmitted when LBT fails. Therefore, a terminal device in a cell served by the network device needs to know when the network device starts downlink transmission and stops downlink transmission, so as to implement correct data communication between the terminal device and the network device.

In the LAA-LTE system, there are Cell-specific Reference Signals (CRS) in each subframe sent by a network device. A terminal device may detect whether there is a CRS in a present subframe to judge whether there is downlink transmission of a network device in the subframe, thereby implementing correct data communication with the network device.

However, when a New Radio (NR) technology is applied to an unlicensed spectrum, there is no CRS in an NR system. Under such a circumstance, how a terminal device determines a time-frequency resource used for downlink transmission of a network device to implement correct data communication with the network device is a problem urgent to be solved.

SUMMARY

The embodiments of the disclosure provide an information transmission method, a network device and a terminal device, which may enable the terminal device to recognize a time-frequency resource for downlink transmission of the network device.

A first aspect provides an information transmission method, which may be applied to a communication system including a network device and a terminal device, a frequency-domain resource on a carrier used by the communication system being a contention based frequency-domain resource, the method including the following operations. The terminal device receives first information from the network device through a first time-frequency resource, the first time-frequency resource being a time-frequency resource in a first downlink transmission burst. The terminal device determines, according to the first information, that the first time-frequency resource is a downlink time-frequency resource.

A second aspect provides an information transmission method, which may be applied to a communication system including a network device and a terminal device, a frequency-domain resource on a carrier used by the communication system being a contention based frequency-domain resource. The method includes the following operations. The network device determines an available first time-frequency resource, the first time-frequency resource being a time-frequency resource in a first downlink transmission burst. The network device sends first information to the terminal device through the first time-frequency resource, the first information being used by the terminal device to determine that the first time-frequency resource is a downlink time-frequency resource.

A third aspect provides a terminal device, which includes an input interface, a processor and a memory for storing instruction executable by the processor, the input interface, the processor and the memory being connected through a bus system. The processor is configured to execute the instructions stored in the memory to execute the method in the first aspect or any possible implementation mode of the first aspect.

A fourth aspect provides a network device, which includes an output interface, a processor and a memory for storing instruction executable by the processor, the output interface, the processor and the memory being connected through a bus system. The processor is configured to execute the instructions stored in the memory to execute the method in the second aspect or any possible implementation mode of the second aspect.

BRIEF DESCRIPTION OF THE DRAWINGS

FIG. 1 is a schematic diagram of a communication system according to an embodiment of the disclosure.

FIG. 2 is a schematic flowchart of an information transmission method according to an embodiment of the disclosure.

FIG. 5 is a schematic diagram of another implementation mode of transmitting indication information by beamforming in two directions.

FIG. 6 is a schematic flowchart of an information transmission method according to an embodiment of the disclosure.

DETAILED DESCRIPTION

Figure 3:
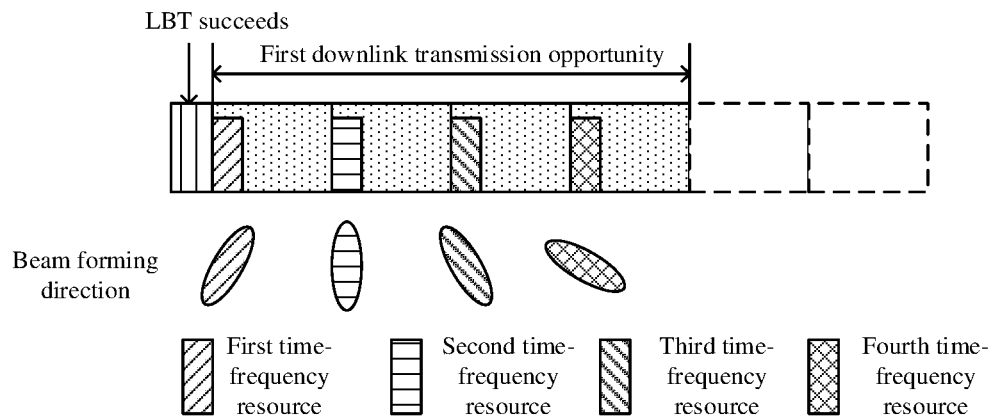
FIG. 3 is a schematic diagram of an example of an information transmission method according to an embodiment of the disclosure.

The technical solutions in the disclosure will be described below in combination with the drawings.

Terms "part", "module", "system" and the like used in the specification are adopted to represent a computer related entity, hardware, firmware, hardware and software combination, software or software in execution. For example, a part may be, but not limited to, a process running on a processor, the processor, an object, an executable file, an execution thread, a program and/or a computer. The drawings show that both an application running in a computing device and the computing device may be parts. One or more parts may reside in a process or an execution thread, and the parts may be located on a computer and/or distributed between two or more computers. In addition, these parts may be executed from various computer-readable media with various data structures stored thereon. The "parts" may communicate through local or remote processes according to, for example, signals with one or more data groups (for example, data from two parts interacting with another part of a local system, a distributed system or a network, for example, the Internet interacting with another system through signals).

It is to be understood that the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), an LTE system, an Advanced Long Term Evolution (LTE-A) system, an NR system, an evolved system of the NR system such as an NR-based access to unlicensed spectrum (NR-U) system, a Universal Mobile Telecommunication System (UMTS), a Wireless Local Area Network (WLAN) and a Wireless Fidelity (WiFi) or next-generation communication system.

Generally speaking, connections supported by a conventional communication system are usually limited in number and also easy to implement. However, along with the development of communication technologies, a mobile communication system will not only support conventional communication but also support, for example, Device to Device (D2D) communication, Machine to Machine (M2M) communication, Machine Type Communication (MTC) and Vehicle to Vehicle (V2V) communication.

A communication system in the embodiments of the disclosure may be applied to a Carrier Aggregation (CA) scenario, may also be applied to a Dual Connectivity (DC) scenario and may further be applied to a Standalone (SA) network deployment scenario.

When the communication system in the embodiments of the disclosure is applied to an unlicensed spectrum and a network deployment scenario is CA, the CA network deployment scenario may be that a primary carrier is in a licensed spectrum, a secondary carrier is in the unlicensed spectrum, and the primary carrier is connected with the secondary carrier through an ideal backhaul.

When the communication system in the embodiments of the disclosure is applied to the unlicensed spectrum and the network deployment scenario is DC, the DC network deployment scenario may be that the primary carrier is in the licensed spectrum, the secondary carrier is in the unlicensed spectrum, and the primary carrier is connected with the secondary carrier through a non-ideal backhaul. A system on the primary carrier and a system on the secondary carrier may be different systems, for example, the system on the primary carrier is an LTE system, and the system on the secondary carrier is an NR system. Or, the system on the primary carrier and the system on the secondary carrier may also be the same system, for example, both the systems on the primary carrier and the secondary carrier are LTE systems or NR systems.

When the communication system in the embodiments of the disclosure is applied to the unlicensed spectrum and the network deployment scenario is SA, a terminal device may access a network through a system on the unlicensed spectrum.

Various embodiments of the disclosure are described in combination with a network device and a terminal device.

The terminal device may also be called User Equipment (UE), an access terminal, a user unit, a user station, a mobile radio station, a mobile station, a remote station, a remote terminal, a mobile device, a user terminal, a terminal, a wireless communication device, a user agent, a user device or the like. The terminal device may be a Station (ST) in the WLAN, and may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle device, a wearable device, a terminal device in a next-generation communication system, for example, a future fifth-Generation (5G) network, a terminal device in a future evolved Public Land Mobile Network (PLMN) or the like.

Exemplarily but unlimitedly, in the embodiments of the disclosure, the terminal device may also be a wearable device. The wearable device may also be called a wearable intelligent device, which is a generic term of wearable devices obtained by performing intelligent designing and development on daily wearing products, for example, glasses, gloves, watches, clothes and shoes. The wearable device is a portable device directly worn or integrated to clothes or accessory of a user. The wearable device not only is a hardware device but also realizes powerful functions through software support, data interaction and cloud interaction. Generalized wearable intelligent device includes, for example, intelligent watches or intelligent glasses with complete functions and large sizes and capable of realizing all or part of functions independently of intelligent phones, and for example, various types of intelligent bands and intelligent jewelries of which each is dedicated to application functions of a certain type and required to be matched with other devices such as intelligent phones for use.

The network device may be a device configured to communicate with a mobile device, and the network device may be an Access Point (AP) in the WLAN, a Base Transceiver Station (BTS) in the GSM or CDMA, may also be a NodeB (NB) in WCDMA, and may further be an Evolutional Node B (eNB or eNodeB) in LTE, or a relay station or AP, or a vehicle device, a wearable device, a network device in the future 5G network, a network device in the future evolved PLMN or the like.

In the embodiments of the disclosure, the network device provides service for a cell, and the terminal device communicates with the network device through a transmission resource (for example, a frequency-domain resource or a spectrum resource) for the cell. The cell may be a cell corresponding to the network device (for example, a base station), and the cell may belong to a macro base station and may also be a base station corresponding to a small cell. Here, the small cell may include: a Metro cell, a Micro cell, a Pico cell, a Femto cell and the like. These small cells have the characteristics of small coverage and low transmitted power and are applied to provision of high-rate data transmission service.

In the embodiments of the disclosure, multiple cells may simultaneously operate at the same frequency on a carrier of an LTE system or a 5G system, and in some special scenarios, concepts of carrier and cell may also be considered to be equivalent. For example, in a CA scenario, when a secondary carrier is configured for UE, both a carrier index of the secondary carrier and a Cell Identify (Cell ID) of a secondary cell operating on the secondary carrier may be contained, and under this condition, the carrier may be considered to be identical to the cell. For example, access to a carrier and access to a cell are equivalent for UE.

A method and device provided in the embodiments of the disclosure may be applied to a terminal device or a network device. The terminal device or the network device includes a hardware layer, an operating system layer running in the hardware layer and an application layer running in the operating system layer. The hardware layer includes hardware such as a Central Processing Unit (CPU), a Memory Management Unit (MMU) and a memory (also called a main memory). An operating system may be any one or more computer operating systems implementing service processing through processes, for example, a Linux operating system, a Unix operating system, an Android operating system, an iOS operating system or a windows operating system. The disclosure layer includes an application such as a browser, a contact list, word processing software and instant messaging software. Moreover, a specific structure of an execution entity of the method provided in the embodiments of the disclosure is not specially limited in the embodiments of the disclosure if a program recording a code for the method provided in the embodiments of the disclosure may be run to implement communication according to the method provided in the embodiments of the disclosure. For example, the execution entity of the method provided in the embodiments of the disclosure may be the terminal device or the network device, or, a function module capable of calling the program and executing the program in the terminal device or the network device.

In addition, various aspects or characteristics of the embodiments of the disclosure may be implemented into a method, a device or a product programed with a standard and/or using an engineering technology. Term "product" used in the disclosure covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disc (CD) and a Digital Versatile Disc (DVD)), a smart card and a flash memory (for example, an Erasable Programmable Read-Only Memory (EPROM), a card, a stick or a key driver). In addition, various storage media described in the disclosure may represent one or more devices and/or other machine-readable media configured to store information. Term "machine-readable medium" may include, but not limited to, a wireless channel and various other media capable of storing, including and/or bearing instructions and/or data.

FIG. 1 is a schematic diagram of a communication system according to an embodiment of the disclosure. As shown in FIG. 1, the communication system 100 includes a network device 110 and a terminal device 120. The network device 110 may send a downlink physical channel or reference signal, for example, common DCI or a predefined reference signal, to the terminal device 120 in a beamforming manner. The terminal device 120, after detecting the DCI or the reference signal, may determine a starting position and/or ending position of a present downlink transmission burst, and may further measure CSI of the downlink physical channel sent by the network device according to the starting position and/or ending position of the present downlink transmission burst, so as to implement normal data communication between the terminal device and the network device.

Due to serious fading of signals during signal transmission in a high-frequency scenario, the network device 110, when sending the DCI or the reference signal, may process the DCI or the reference signal by beamforming in at least two directions (for example, beamforming 130 and beamforming 140) to improve receiving probabilities that the terminal device correctly receives the DCI or the reference signal in different directions.

It is to be noted that the downlink physical channel in the embodiments of the disclosure may include a PDCCH, a Physical Downlink Shared Channel (PDSCH), a Physical Hybrid Automatic Repeat reQuest (ARQ) Indicator Channel (PHICH), a Physical Multicast Channel (PMCH), a Physical Broadcast Channel (PBCH) and the like. The reference signal may include a Phase Tracking Reference Signal (PT-RS), a DeModulation Reference Signal (DMRS), a Channel State Information-Reference Signal (CSI-RS) and the like. The DMRS is used for demodulation of the downlink channel, the CSI-RS is used for measurement on the downlink channel, and the PT-RS is configured for downlink time-frequency synchronization or phase tracking.

In addition, the communication system 100 may be a PLMN network, or a D2D network, or an M2M network or another network. FIG. 1 is only a simplified schematic diagram listed as an example, and the network may further include another network device which is not presented in FIG. 1.

Frequency-domain resources used for wireless communication in the embodiment of the disclosure will be described below in detail.

In the embodiment of the disclosure, frequency-domain resources for wireless communication (for example, uplink transmission or downlink transmission) of the network device and the terminal device are frequency-domain resources used based on a contention mechanism.

For example, the network device and/or the terminal device may detect whether a frequency-domain resource with a certain bandwidth (for example, 20 MHz) is presently in an idle state, or whether the frequency-domain resource is used by another device.

If the frequency-domain resource is in the idle state or the frequency-domain resource is not used by the other device, the network device and/or the terminal device may use the frequency-domain resource for communication, for example, for uplink transmission or downlink transmission.

If the frequency-domain resource is not in the idle state or the frequency-domain resource has been used by the other device, the network device and/or the terminal device may not use the frequency-domain resource.

It is to be noted that, in the embodiment of the disclosure, a specific method and procedures based on the contention mechanism may be similar to a conventional art and, detailed descriptions thereof are omitted herein for avoiding elaborations.

Exemplarily but unlimitedly, in some embodiments of the disclosure, a frequency-domain resource used by the communication system 100 (or a contention based frequency-domain resource used by the network device and the terminal device) may also be a licensed spectrum resource. That is, the communication system 100 in the embodiment of the disclosure is a communication system capable of using a licensed band, and moreover, each communication device (the network device and/or the terminal device) in the communication system 100 may use a frequency-domain resource of the licensed band in a contention manner.

The "licensed frequency-domain resource" may also be called a "licensed spectrum resource" or a "licensed carrier" and refers to a frequency-domain resource which may be used only after being examined and approved by the national or local wireless communication commissions. Different systems, for example, an LTE system and a WiFi system, or, systems of different operating companies may not share licensed frequency-domain resources.

The licensed spectrum resource may be a dedicated spectrum resource regulated by the state radio regulating committee, for example, a spectrum resource dedicated to a mobile operating company, civil aviation, railways and polices. Due to exclusiveness of policy, service quality of the licensed spectrum resource may usually be guaranteed, and it is also relatively easy to implement scheduling control.

Or, in some embodiments of the disclosure, the frequency-domain resource used by the communication system 100 (or the frequency-domain resource used by the network device and/or the terminal device based on the contention mechanism) may be an unlicensed frequency-domain resource.

The "unlicensed frequency-domain resource" may also be called an "unlicensed spectrum resource" or an "unlicensed carrier", and refers to a resource that may be shared by each communication device on an unlicensed band. Resource sharing on the unlicensed frequency band refers to specifying limits to only indexes such as transmitted power and out-of-band leakage in terms of use of a specific spectrum to ensure that a basic coexistence requirement of multiple devices sharing the frequency band is met. An operating company may use unlicensed frequency band resources to achieve a purpose of network capacity offloading, but is required to comply with regulatory requirements on the unlicensed frequency band resources in different regions and different spectrums. These requirements are usually made to protect public systems such as radar and to ensure that no detrimental impact and fair coexistence occurs between multiple systems as much as possible, and include transmit power limits, out-of-band leakage index and indoor and outdoor use limits, some additional coexistence strategies in some regions, and the like. For example, various communication devices may use spectrum resources in a contention manner or a monitoring manner, for example, a manner specified by LBT.

The unlicensed spectrum resource may be a spectrum resource regulated by a government-related department, radio technologies, operating enterprises and service life are not limited, and meanwhile, service quality of this band is also not guaranteed. A communication device using the unlicensed spectrum resource may use it for free if the requirements on the indexes such as the transmitted power and the out-of-band leakage are met. Common systems that use unlicensed spectrum resources for communication include a WiFi system and the like.

Exemplarily but unlimitedly, in some embodiments of the disclosure, the unlicensed spectrum resource may include a band nearby 5 Giga Hertz (GHz), a band nearby 2 GHz, a band nearby 3.5 GHz, a band nearby 37 GHz and a band nearby 60 GHz.

Moreover, a concept of transmission burst is introduced into a frame structure of an LTE system in an unlicensed band, namely transmission of the network device is opportunistic, data is transmitted only when LBT succeeds and no data may be transmitted when LBT fails.

In this way, when an NR technology is applied to an unlicensed spectrum, since there is no CRS in an NR system, it is infeasible to detect existence of a CRS to determine whether there is downlink transmission of a network device in a subframe.

In view of this, the embodiments of the disclosure provide an information transmission method, which enables the terminal device to identify a time-frequency resource for transmission of a network device, such that normal communication between the network device and the terminal device is performed.

The information transmission method of the embodiments of the disclosure will be described below in combination with FIG. 2 to FIG. 6. It is to be noted that a "time-frequency resource" described below may include a resource in a time domain and may also include a resource in a frequency domain. In the embodiments of the disclosure, a manner for use of the resource in the time domain is mainly involved, and thus a manner for use of the "time-frequency resource" in the following process of describing the information transmission method of the embodiments of the disclosure mainly refers to use of the resource in the time domain. A manner for use of the resource in the frequency domain may be the same as or similar to the conventional art, and detailed descriptions thereof are omitted herein for avoiding elaborations.

It is to be understood that FIG. 2 to FIG. 6 are schematic flowcharts of the information transmission method of the embodiments of the disclosure and show detailed communication steps or operations of the method. However, these steps or operations are only exemplary. Other operations or modifications of various operations in FIG. 2 to FIG. 6 may also be executed in the embodiments of the disclosure.

In addition, various steps in FIG. 2 to FIG. 6 may be executed in sequences different from those presented in FIG. 2 to FIG. 6 respectively, and not all the operations in FIG. 2 to FIG. 6 may be executed.

FIG. 2 is a schematic flowchart of an information transmission method 200 according to an embodiment of the disclosure. As shown in FIG. 2, the method 200 may include the following operations.

In S201, a network device determines an available first time-frequency resource, the first time-frequency resource being a time-frequency resource in a first downlink transmission burst.

In S202, the network device sends first information to a terminal device through the first time-frequency resource, the first information being used by the terminal device to determine that the first time-frequency resource is a downlink time-frequency resource, the first information being further configured to determine an ending position of the first downlink transmission burst and the first information being information obtained by first beamforming processing.

In the embodiment of the disclosure, before signal transmission being performed by the network device in an unlicensed spectrum, the network device may performs LBT detection on a carrier in the unlicensed spectrum, the network device obtains a downlink transmission burst after LBT succeeds, and the network device may perform downlink transmission in the downlink transmission burst. The downlink transmission burst may be defined as a time unit continuously transmitted by the network device, and a time unit may be defined as one or more subframes, may also be defined as one or more slots or may also be defined as one or more mini-slots, etc. There are no limits made thereto in the embodiment of the disclosure.

In some embodiments of the disclosure, the first downlink transmission burst may include one time-frequency resource and may also include multiple time-frequency resources. The first time-frequency resource may be a starting time-frequency resource in the first downlink transmission burst, namely a time-domain position of the first time-frequency resource is prior to time-domain positions of the other time-frequency resources in the first downlink transmission burst. The first time-frequency resource may also be a middle time-frequency resource in the first downlink transmission burst, namely other time-frequency resources may exist prior to the first time-frequency resource in the first downlink transmission burst. Or, the first time-frequency resource may also be a last time-frequency resource in the first downlink transmission burst, namely the time-domain position of the first time-frequency resource is after the time-domain positions of the other time-frequency resources in the first downlink transmission burst. There are no special limits made thereto in the embodiment of the disclosure.

It is to be understood that, in the embodiment of the disclosure, a starting time unit and/or ending time unit of a downlink transmission burst may be a complete time unit, for example, a complete subframe, slot or mini-slot, etc., and may also be a part of a time unit, for example, a part of a subframe, slot or a mini-slot, etc. There are no limits made thereto in the embodiment of the disclosure.

The network device may send DCI or a reference signal in a part or all of a time unit in a downlink transmission burst, and the terminal device, after receiving the DCI or the reference signal, may determine whether there is downlink transmission of the network device in a present time unit, namely whether the network device performs downlink transmission in the present time unit. The DCI may be transmitted through a common PDCCH and may also be transmitted through a group PDCCH. A sequence of the reference signal may be generated according to a cell ID, or the sequence of the reference signal may also be predefined. There are no limits made thereto in the embodiment of the disclosure.

In the embodiment of the disclosure, the DCI or the reference signal may contain indication information, and the indication information may be used by the terminal device to determine that a time-frequency resource for transmitting the indication information is a downlink time-frequency resource, namely the terminal device may determine whether there is downlink transmission of the network device in the present time unit according to the indication information. Furthermore, the indication information may further be used by the terminal device to determine an ending position of the present downlink transmission burst, and then the terminal device may determine when the network device stops downlink transmission according to the ending position of the present downlink transmission burst, so that normal data communication with the network device may be implemented.

In some embodiments, the indication information is transmitted in a complete downlink time unit. In some embodiments, the operation that the terminal device may determine whether there is downlink transmission of the network device in the present time unit according to the indication information includes that: the terminal device may determine according to the indication information that there is downlink transmission of the network device on all time resources comprised in the present time unit.

It is to be noted that, in some optional embodiments, if the network device has no right to use a channel at the start of the time unit, but has the right to use the channel in middle of the time unit, the network device may still perform downlink transmission in the remaining part of the time unit. Or, the network device may perform downlink transmission in time resources of a first part of a time unit and perform uplink transmission in the time resources of a second part. Or, the network device may perform uplink transmission in time resources of a first part of a time unit and perform downlink transmission in time resources of a second part. Under the circumstance that part of time resources in a time unit are used for downlink transmission, the network device may send, or not send the indication information, and may also send the indication information under some circumstances and not send the indication information under some other circumstances (for example, the indication information is sent when the part of the time unit is a first part of the time unit, and the indication information is not sent when the part of the time unit is a second part of the time unit). There are no limits made thereto in the disclosure.

In some embodiments, the indication information is transmitted in a complete or a part of a downlink time unit. In some embodiments, the operation that the terminal device may determine whether there is downlink transmission of the network device in the present time unit according to the indication information includes that: the terminal device may determine, according to the indication information, that there is downlink transmission of the network device on all or part of time resources in the present time unit.

It is to be noted that, if the indication information is transmitted through the first time-frequency resource, the indication information may correspond to the abovementioned first information. Or, if the indication information is transmitted through a second time-frequency resource after the first time-frequency resource, the indication information may be recorded as second information. Both the first information and the second information may be used by the terminal device to determine the ending position of the first downlink transmission burst. The ending position determined according to the first information and the ending position determined according to the second information, of the first downlink transmission burst may be the same and may also be different. If they are different, it is indicated that the ending position of the first downlink transmission burst is updated, and the terminal device may further perform data communication with the network device according to the updated ending position of the first downlink transmission burst.

An implementation process of the information transmission method according to the embodiment of the disclosure will be introduced below in combination with FIG. 3 in detail. At a certain moment, the network device preempts the right to use the channel, namely the LBT succeeds, so that the network device obtains a downlink transmission burst, recorded as the first downlink transmission burst. For example, the first downlink transmission burst includes four time units, each of which includes time-frequency resources (for example, the first time-frequency resource, the second time-frequency resource, a third time-frequency resource and a fourth time-frequency resource) used for transmitting the indication information, and the network device may transmit indication information in each time unit of the first downlink transmission burst. The time-frequency resources in each time unit may be predefined (for example, a position of the time-frequency resources in the time unit is pre-specified in a communication standard), may also be configured by a high layer (for example, configured through Radio Resource Control (RRC) signaling or Media Access Control (MAC) signaling), and may also be dynamically indicated (for example, indicated through physical-layer signaling). There are no limits made thereto in the embodiments of the disclosure.

Due to serious fading of signals during signal transmission in a high-frequency scenario, the network device may firstly perform beamforming processing on the indication information and then send the indication information, so as to improve the probability that the terminal device correctly receives the indication information. In addition, for enabling terminal devices in different directions to correctly receive the indication information, the network device may further send the indication information in at least two different directions of beamforming. For example, the network device may send the indication information, i.e., the abovementioned first information, on the first time-frequency resource in a first beamforming direction, send the indication information on the second time-frequency resource in a second beamforming direction, send the indication information on the third time-frequency resource in a third beamforming direction and send the indication information on the fourth time-frequency resource in a fourth beamforming direction. At least two beamforming directions of the first beamforming, second beamforming, third beamforming or fourth beamforming are different.

It is to be understood that, in the embodiments of the disclosure, the indication information sent through the first time-frequency resource, the second time-frequency resource, the third time-frequency resource or the fourth time-frequency resource may be the same or different. For example, the indication information sent through different time-frequency resources may indicate the same ending position of the first downlink transmission burst and may also be configured to indicate different ending positions of the first downlink transmission burst. That is, the first information transmitted through the first time-frequency resource and the second information transmitted through the second time-frequency resource may indicate the same ending position and may also indicate different ending positions. There are no limits made thereto in the embodiments of the disclosure.

In some embodiments of the disclosure, the indication information is configured to determine the ending position of the first downlink transmission burst. For example, the indication information may be configured to indicate a serial number of an ending time unit of the first downlink transmission burst. Assuming that the ending time unit of the first downlink transmission burst is a slot 4, the indication information may be configured to indicate the slot 4. For another example, the indication information may also be configured to indicate the number of the remaining time units in the first downlink transmission burst, i.e., the number of time units that may be used for downlink transmission starting from the present time unit, so that the terminal device determines the ending position of the first downlink transmission burst according to the number of the remaining time units in the first downlink transmission burst.

For example, as shown in FIG. 3, in a first time unit of the first downlink transmission burst, the indication information may indicate 3, namely the indication information (i.e., the first information) received on the first time-frequency resource may be configured to indicate 3, which represents that the number of the remaining time units in the first downlink transmission burst is 3. If the present time unit is a slot 1, the ending position of the first downlink transmission burst is the slot 4.

In a second time unit of the first downlink transmission burst, the indication information may indicate 2, namely the indication information (i.e., the second information) received on the second time-frequency resource may be configured to indicate 2, which represents that the number of the remaining time units in the first downlink transmission burst is 2. If the present time unit is a slot 2, the ending position of the first downlink transmission burst is the slot 4.

In a third time unit of the first downlink transmission burst, the indication information may indicate 1, namely the indication information (i.e., third information) received on the third time-frequency resource may be configured to indicate 1, which represents that the number of the remaining time units in the first downlink transmission burst is 1. If the present time unit is a slot 3, the ending position of the first downlink transmission burst is the slot 4.

In a fourth time unit of the first downlink transmission burst, the indication information may indicate 0, namely the indication information (i.e., fourth information) received on the fourth time-frequency resource may be configured to indicate 0, which represents that the number of the remaining time units in the first downlink transmission burst is 0. If the present time unit is the slot 4, the present time unit is the ending position of the first downlink transmission burst.

Therefore, the terminal device may detect the indication information in any time unit in the first downlink transmission burst to determine the ending position of the first downlink transmission burst. In some embodiments, if ending positions of the first downlink transmission burst determined according to indication information in different time units are different, the ending position, indicated by the latest indication information, of the first downlink transmission burst is adopted.

In some embodiments, the indication information may further be used to determine a starting position of the first downlink transmission burst. For example, the indication information (i.e., the first information) received in the first time unit of the first downlink transmission burst may be configured to indicate 0, the indication information (i.e., the second information) received in the second time unit of the first downlink transmission burst may be configured to indicate 1, the indication information (i.e., the third information) received in the third time unit of the first downlink transmission burst may be configured to indicate 2, and the indication information (i.e., the fourth information) received in the fourth time unit of the first downlink transmission burst may be configured to indicate 3. Therefore, the terminal device may detect the indication information in any time unit in the first downlink transmission burst to determine the starting position of the first downlink transmission burst, and thus may further perform normal data communication with the network device according to the starting position of the first downlink transmission burst.

In some embodiments, the indication information may further be used to determine a position of the time unit where the indication information is located in the first downlink transmission burst. For example, the indication information may be configured to indicate a position of the time unit where the indication information is located relative to the first time unit, or the last time unit, or the Kth predefined time units in the first downlink transmission burst, K being a positive integer greater than 1. After receiving the indication information, the terminal device may determine the position of the time unit where the indication information is located in the first downlink transmission burst, then determine the starting position and/or ending position of the first downlink transmission burst, and perform normal data communication with the network device according to the starting position and/or ending position of the first downlink transmission burst.

In some embodiments, the indication information may further contain beam identification information of beamforming for transmission of the indication information. For example, as shown in FIG. 3, if identifications of beams for transmission of the corresponding indication information on the first time-frequency resource, the second time-frequency resource, the third time-frequency resource and the fourth time-frequency resource are #0, #2, #4 and #6 respectively, beam identification information in the indication information (i.e., the first information) transmitted in the first time unit of the first downlink transmission burst may be #0, beam identification information in the indication information (i.e., the second information) transmitted in the second time unit of the first downlink transmission burst may be #2, beam identification information in the indication information (i.e., the third information) transmitted in the third time unit of the first downlink transmission burst may be #4, and beam identification information in the indication information (i.e., the fourth information) transmitted in the fourth time unit of the first downlink transmission burst may be #6.

In the embodiment of the disclosure, the indication information transmitted through different time-frequency resources may be information obtained by beamforming processing. For example, the first information may be information obtained by first beamforming processing, and the second information may be information obtained by second beamforming processing. A beam ID of the first beamforming and a beam ID of the second beamforming may be the same or different. Directions of first beamforming and second beamforming may be the same or different. There are no limits made thereto in the embodiments of the disclosure.

In some embodiments, the indication information may further contain identification information of a cell where the network device is located.

In the embodiment of the disclosure, the first beamforming is applied to a first time unit in the first downlink transmission burst; or, the first beamforming is applied to an mth time unit of P time units in the first downlink transmission burst, where P represents the number of the time units in the first downlink transmission burst, P being a positive integer and m being an odd number; or, the first beamforming is applied to an nth time unit of the P time units in the first downlink transmission burst, where P represents the number of the time units in the first downlink transmission burst, P being a positive integer and n being an even number; or, the first beamforming is applied to at least one time unit of first p time units in the first downlink transmission burst, p=ceil(P/2), where P represents the number of the time units in the first downlink transmission burst and ceil( ) representing rounding-up.

That is, the first beamforming may be applied to the first time unit or some specific time units in the first downlink transmission burst, and the above positions of the specific time units are not limitations but only examples. The first beamforming may also be applied to time units meeting other conditions, which will not limited thereto in the embodiments of the disclosure.

In some embodiments, second beamforming is applied to a next time unit to a time unit to which first beamforming is applied; or, the second beamforming is applied to the mth time unit of the P time units in the first downlink transmission burst, where P represents the number of the time units in the first downlink transmission burst, P being a positive integer and m being an odd number; or, the second beamforming is applied to the nth time unit in the P time units of the first downlink transmission burst, where P represents the number of the time units in the first downlink transmission burst, P being a positive integer and n being an even number; or, the second beamforming is applied to at least one time unit in last q time units of the first downlink transmission burst, q=floor(P/2), where P represents the number of the time units in the first downlink transmission burst and floor( ) representing rounding-down.

That is, the second beamforming may be applied to the next time unit to a time unit to which the first beamforming is applied, or some specific time units, and the above positions of the specific time units are not limitations but only examples. The second beamforming may also be applied to time units meeting other conditions, which will not limited thereto in the embodiments of the disclosure.

In the embodiment of the disclosure, for improving the probability of correct reception of the DCI or the reference signal, the network device may transmit the indication information in at least two beamforming directions. How to implement transmission of the indication information, for example in two beamforming directions will be introduced below in combination with FIG. 4 and FIG. 5.

As an embodiment, the first beamforming may be applied to each time unit of the first p time units in the first downlink transmission burst, and the second beamforming may be applied to each time unit in the last q time units of the P time units in the first downlink transmission burst, where p=ceil(P/2), q=floor(P/2), P representing the number of the time units in the first downlink transmission burst, ceil( ) representing rounding-up and floor( ) representing rounding-down.

Figure 4:
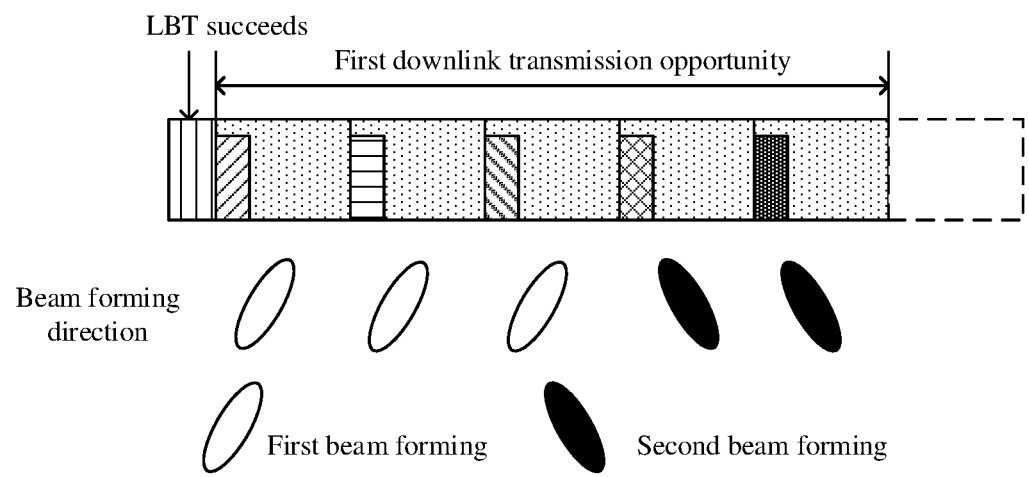
FIG. 4 is a schematic diagram of an implementation mode of transmitting indication information by beamforming in two directions.

For example, in FIG. 4, if P is valued to be 5, p is 3 and q is 2, namely the first beamforming is applied to the first three time units in the first downlink transmission burst and second beamforming is applied to the last two time units in the first downlink transmission burst.

As another embodiment, the first beamforming is applied to the mth time unit of the P time units in the first downlink transmission burst, m being an odd number, and the second beamforming is applied to the nth time unit of the P time units in the first downlink transmission burst, n being an even number.

For example, in FIG. 5, if P is valued to be 5, the first beamforming is applied to the first, third and fifth time units in the first downlink transmission burst and the second beamforming is applied to the second and fourth time units in the first downlink transmission burst.

Therefore, according to the information transmission method of the embodiment of the disclosure, the terminal device, when receiving DCI or a reference signal, may determine a starting position and/or ending position of a present downlink transmission burst according to indication information in the DCI or the reference signal, and may perform normal data communication with the network device according to the starting position and/or ending position of the downlink transmission burst. In addition, in a scenario of serious fading of signals during signal transmission, according to the information transmission method in the embodiments of the disclosure, when the DCI or the reference signal is sent, the DCI or the reference signal may be processed by beamforming in at least two directions, which is favorable for improving probabilities that terminal devices in different directions correctly receive the DCI or the reference signal.

The information transmission method of the embodiment of the disclosure is described above in combination with FIG. 2 to FIG. 5 in detail from the network device side. An information transmission method of another embodiment of the disclosure will be described below in combination with FIG. 6 in detail from the terminal device side. It is to be understood that descriptions made on a terminal device side correspond to descriptions made on a network device side, where similar descriptions may refer to the above and will not be elaborated herein for avoiding repetitions.

FIG. 6 is a schematic flowchart of a data transmission method 600 according to another embodiment of the disclosure. The method 600 may be executed by a terminal device in the communication system shown in FIG. 1. As shown in FIG. 6, the method 600 is applied to a communication system including a network device and a terminal device, a frequency-domain resource on a carrier used by the communication system being a contention-based frequency-domain resource. The method 600 includes the following operations.

In S601, the terminal device receives first information from the network device through a first time-frequency resource, the first time-frequency resource being a time-frequency resource in a first downlink transmission burst.

In S602, the terminal device determines that the first time-frequency resource is a downlink time-frequency resource according to the first information, the first information being further used to determine an ending position of the first downlink transmission burst and the first information being information obtained by first beamforming processing.

In the embodiment of the disclosure, since the terminal device initially does not know a time-frequency resource for downlink transmission of the network device, the terminal device acquires the first information in a blind detection manner. The terminal device, after acquiring the first information, may determine the time-frequency resource for downlink transmission of the network device according to the first information, so as to perform normal data communication with the network device.

In some embodiments, the first information is further used to determine at least one of the following:

a starting position of the first downlink transmission burst, a position of the first time-frequency resource in the first downlink transmission burst, the number of remaining time units in the first downlink transmission burst, an ID of a cell where the network device is located or a beam ID obtained by first beamforming.

In some embodiments, the operation that the terminal device receives the first information from the network device through the first time-frequency resource includes the following operation.

The terminal device receives the first information that is transmitted on the first time-frequency resource by the network device through a PDCCH or through a reference signal.

In some embodiments, the first beamforming is applied to a first time unit in the first downlink transmission burst; or, the first beamforming is applied to an mth time unit in P time units of the first downlink transmission burst, P representing the number of the time units in the first downlink transmission burst, P being a positive integer and m being an odd number; or, the first beamforming is applied to a nth time unit of the P time units in the first downlink transmission burst, P representing the number of the time units in the first downlink transmission burst, P being a positive integer and n being an even number; or, the first beamforming is applied to at least one time unit of first p time units in the first downlink transmission burst, p=ceil(P/2), P representing the number of the time units in the first downlink transmission burst and ceil( ) representing rounding-up.

In some embodiments, the method further includes the following operations.

The terminal device receives second information that is sent by the network device through a second time-frequency resource.

The terminal device determines, according to the second information, that the second time-frequency resource is a downlink time-frequency resource, the second information being further used to determine the ending position of the first downlink transmission burst, the second information being information obtained by second beamforming processing, the second time-frequency resource being a time-frequency resource in the first downlink transmission burst and the second time-frequency resource being positioned later than the first time-frequency resource in time.

In some embodiments, the second information is further used to determine at least one of the following:

the starting position of the first downlink transmission burst, a position of the second time-frequency resource in the first downlink transmission burst, the number of the remaining time units in the first downlink transmission burst, the ID of the cell where the network device is located or a beam ID obtained by second beamforming.

In some embodiments, the beam ID obtained by first beamforming is different from the beam ID obtained by second beamforming.

In some embodiments, the second beamforming is applied to a next time unit of the time unit that first beamforming is applied to; or, the second beamforming is applied to the mth time unit of the P time units in the first downlink transmission burst, P representing the number of the time units in the first downlink transmission burst, P being a positive integer and m being an odd number; or, the second beamforming is applied to the nth time unit of the P time units in the first downlink transmission burst, P representing the number of the time units in the first downlink transmission burst, P being a positive integer and n being an even number; or, the second beamforming is applied to at least one time unit of last q time units in the first downlink transmission burst, q=floor(P/2), P representing the number of the time units in the first downlink transmission burst and floor( ) representing rounding-down.

In some embodiments, the method 600 further includes the following operation.

The terminal device measures CSI of a downlink channel from the network device according to the starting position and/or ending position of the first downlink transmission burst.

The method embodiments of the disclosure are described above in combination with FIG. 2 to FIG. 6 in detail and device embodiments of the disclosure will be described below in combination with FIG. 7 to FIG. 10 in detail. It is to be understood that the device embodiments correspond to the method embodiments and similar descriptions may refer to the method embodiments.

Figure 7:
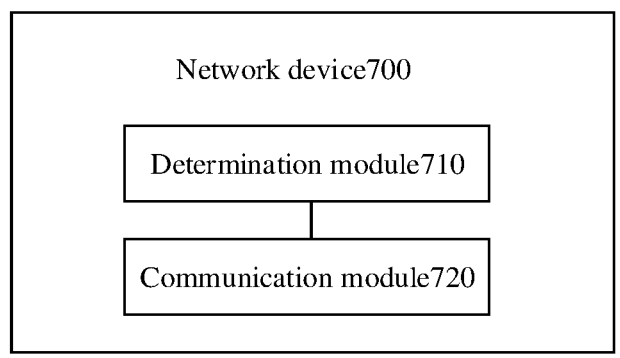
FIG. 7 is a schematic block diagram of a terminal device according to an embodiment of the disclosure.

FIG. 7 is a schematic block diagram of a network device according to an embodiment of the disclosure. A frequency-domain resource on a carrier used by a communication system to which the network device 700 belongs is a contention based frequency-domain resource. The network device 700 in FIG. 7 includes a determination module 710 and a communication module 720.

The determination module 710 is configured to determine an available first time-frequency resource, the first time-frequency resource being a time-frequency resource in a first downlink transmission burst.

The communication module 720 is configured to send first information to a terminal device through the first time-frequency resource, the first information being used by the terminal device to determine that the first time-frequency resource is a downlink time-frequency resource. The first information is further used to determine an ending position of the first downlink transmission burst and the first information is information obtained by first beamforming processing.

In some embodiments, the first information is further used to determine at least one of the following:
a starting position of the first downlink transmission burst, a position of the first time-frequency resource in the first downlink transmission burst, the number of remaining time units in the first downlink transmission burst, an ID of a cell where the network device is located or a beam ID obtained by first beamforming.

In some embodiments, the communication module 720 is specifically configured to:
send the first information to the terminal device on the first time-frequency resource through a PDCCH or a reference signal.

In some embodiments, the first beamforming is applied to a first time unit in the first downlink transmission burst; or,
the first beamforming is applied to an mth time unit of P time units in the first downlink transmission burst, P representing the number of the time units in the first downlink transmission burst, P being a positive integer and m being an odd number; or,
the first beamforming is applied to an nth time unit of the P time units in the first downlink transmission burst, P representing the number of the time units in the first downlink transmission burst, P being a positive integer and n being an even number; or,
the first beamforming is applied to at least one time unit of first p time units in the first downlink transmission burst, p=ceil(P/2), P representing the number of the time units in the first downlink transmission burst and ceil( ) representing rounding-up.

In some embodiments, the communication module 720 is further configured to:
send second information to the terminal device through a second time-frequency resource, the second information being used by the terminal device to determine that the second time-frequency resource is a downlink time-frequency resource, the second information being further used to determine the ending position of the first downlink transmission burst, the second information being information obtained by second beamforming processing, the second time-frequency resource being a time-frequency resource in the first downlink transmission burst and the second time-frequency resource being positioned later than the first time-frequency resource in time.

In some embodiments, the second information is further used to determine at least one of the following:
the starting position of the first downlink transmission burst, a position of the second time-frequency resource in the first downlink transmission burst, the number of the remaining time units in the first downlink transmission burst, the ID of the cell where the network device is located or a beam ID corresponding to second beamforming.

In some embodiments, the beam ID obtained by first beamforming is different from the beam ID obtained by second beamforming.

In some embodiments, the second beamforming is applied to a next time unit to the time unit to which the first beamforming is applied; or,
The second beamforming is applied to the mth time unit of the P time units in the first downlink transmission burst, P representing the number of the time units in the first downlink transmission burst, P being a positive integer and m being an odd number; or, the second beamforming is applied to the nth time unit of the P time units in the first downlink transmission burst, P representing the number of the time units in the first downlink transmission burst, P being a positive integer and n being an even number; or, the second beamforming is applied to at least one time unit of last q time units in the first downlink transmission burst, q=floor(P/2), P representing the number of the time units in the first downlink transmission burst and floor( ) representing rounding-down.

Specifically, the network device 700 may correspond to (for example, be arranged in or itself is) the network device described in the method 200, and each module or unit in the network device 700 is configured to execute each operation or processing process executed by the network device in the method 200. For avoiding elaborations, detailed descriptions will be omitted herein.

Figure 8:
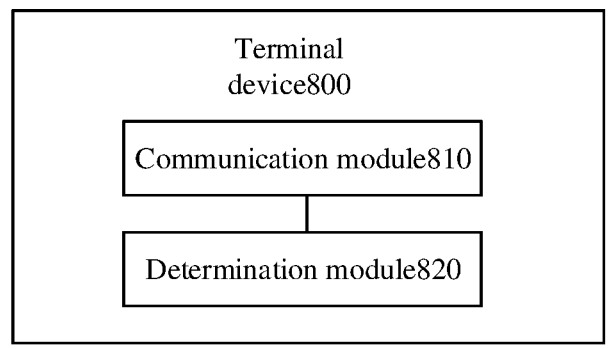
FIG. 8 is a schematic block diagram of a network device according to an embodiment of the disclosure.

FIG. 8 is a schematic block diagram of a terminal device according to an embodiment of the disclosure. A frequency-domain resource on a carrier used by a communication system to which the terminal device belongs is a contention based frequency-domain resource. The terminal device 800 in FIG. 8 includes a communication module 810 and a determination module 820.

The communication module 810 is configured to receive first information from a network device through a first time-frequency resource, the first time-frequency resource being a time-frequency resource in a first downlink transmission burst.

The determination module 820 is configured to determine that the first time-frequency resource is a downlink time-frequency resource according to the first information, the first information being further used to determine an ending position of the first downlink transmission burst and the first information being information obtained by first beamforming processing.

In some embodiments, the first information is further used to determine at least one of the following:
a starting position of the first downlink transmission burst, a position of the first time-frequency resource in the first downlink transmission burst, the number of remaining time units in the first downlink transmission burst, an ID of a cell where the network device is located or a beam ID of first beamforming.

In some embodiments, the communication module 810 is specifically configured to: receive the first information that is transmitted on the first time-frequency resource by the network device through a PDCCH or through a reference signal.

In some embodiments, the first beamforming is applied to a first time unit in the first downlink transmission burst; or, the first beamforming is applied to an mth time unit of P time units in the first downlink transmission burst, P representing the number of the time units in the first downlink transmission burst, P being a positive integer and m being an odd number; or, the first beamforming is applied to a nth time unit of the P time units in the first downlink transmission burst, P representing the number of the time units in the first downlink transmission burst, P being a positive integer and n being an even number; or, the first beamforming is applied to at least one time unit of first p time units in the first downlink transmission burst, p=ceil(P/2), P representing the number of the time units in the first downlink transmission burst and ceil( ) representing rounding-up.

In some embodiments, the communication module 810 is further configured to:

receive second information sent by the network device through a second time-frequency resource.

The determination module 820 is further configured to:

determine that the second time-frequency resource is a downlink time-frequency resource according to the second information, the second information being further used to determine the ending position of the first downlink transmission burst, the second information being information obtained by second beamforming processing, the second time-frequency resource being a time-frequency resource in the first downlink transmission burst and the second time-frequency resource being later than the first time-frequency resource in time.

In some embodiments, the second information is further used to determine at least one of the following:

the starting position of the first downlink transmission burst, a position of the second time-frequency resource in the first downlink transmission burst, the number of the remaining time units in the first downlink transmission burst, the ID of the cell where the network device is located or a beam ID of second beamforming.

In some embodiments, the beam ID obtained by the first beamforming is different from the beam ID obtained by the second beamforming.

In some embodiments, the second beamforming is applied to a next time unit to the time unit to which the first beamforming is applied; or, the second beamforming is applied to the mth time unit of the P time units in the first downlink transmission burst, P representing the number of the time units in the first downlink transmission burst, P being a positive integer and m being an odd number; or, the second beamforming is applied to the nth time unit of the P time units in the first downlink transmission burst, P representing the number of the time units in the first downlink transmission burst, P being a positive integer and n being an even number; or, the second beamforming is applied to at least one time unit of last q time units in the first downlink transmission burst, q=floor(P/2), P representing the number of the time units in the first downlink transmission burst and floor( ) representing rounding-down.

In some embodiments, the communication module 810 is further configured to:

measure CSI of a downlink channel from the network device according to the starting position and/or ending position of the first downlink transmission burst.

Specifically, the terminal device 800 may correspond to (for example, be arranged in or itself is) the terminal device described in the method 600, and moreover, each module or unit in the terminal device 800 is configured to execute each operation or processing process executed by the terminal device in the method 600. For avoiding elaborations, detailed descriptions will be omitted herein.

Figure 9:
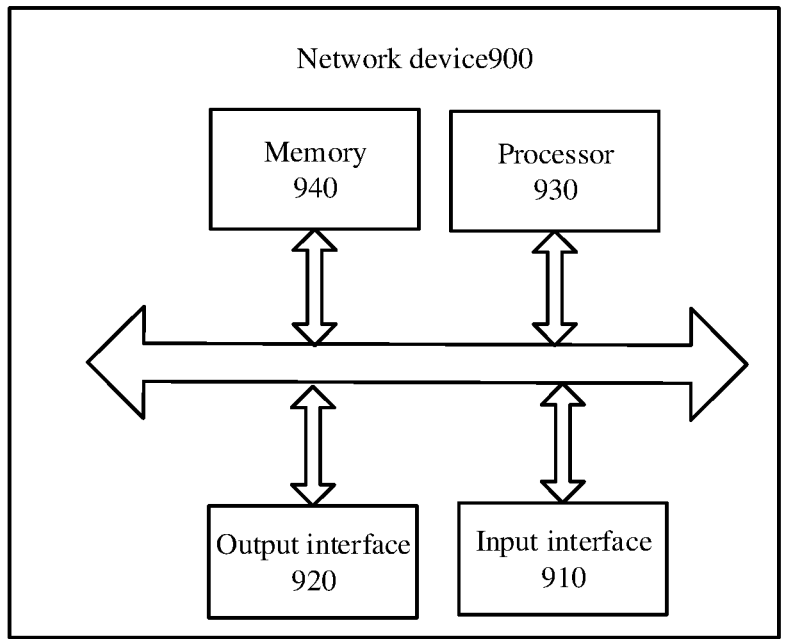
FIG. 9 is a schematic block diagram of a terminal device according to another embodiment of the disclosure.

As shown in FIG. 9, an embodiment of the disclosure also provides a network device 900. The network device 900 may be the network device 700 in FIG. 7, and may be configured to execute operations of the network device corresponding to the method 200 in FIG. 2. The network device 900 includes an input interface 910, an output interface 920, a processor 930 and a memory 940. The input interface 910, the output interface 920, the processor 930 and the memory 940 may be connected through a bus system. The memory 940 is configured to store programs, instructions or codes. The processor 930 is configured to execute the programs, instructions or codes in the memory 940 to control the input interface 910 to receive a signal, control the output interface 920 to send a signal and complete operations in the method embodiments.

It is to be understood that, in the embodiments of the disclosure, the processor 930 may be a Central Processing Unit (CPU) and the processor 930 may also be another universal processor, a Digital Signal Processor (DSP), an Application Specific Integrated Circuit (ASIC), a Field Programmable Gate Array (FPGA) or another programmable logic device, discrete gate or transistor logic device and discrete hardware component and the like. The universal processor may be a microprocessor or the processor may also be any conventional processor and the like.

The memory 940 may include a Read-Only Memory (ROM) and a Random Access Memory (RAM) and provides an instruction and data for the processor 930. A part of the memory 940 may further include a nonvolatile RAM. For example, the memory 940 may further store information of a device type.

In an implementation process, each operation of the method may be completed by an integrated logic circuit of hardware in the processor 930 or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 940. The processor 930 reads information in the memory 940 and completes the operations of the method in combination with hardware. Detailed descriptions are omitted herein to avoid repetitions.

In a specific implementation mode, the determination module 710 of the network device 700 in FIG. 7 may be implemented by the processor 930 in FIG. 9, and the communication module 720 of the network device 700 in FIG. 7 may be implemented by the input interface 910 and output interface 920 in FIG. 9.

Figure 10:
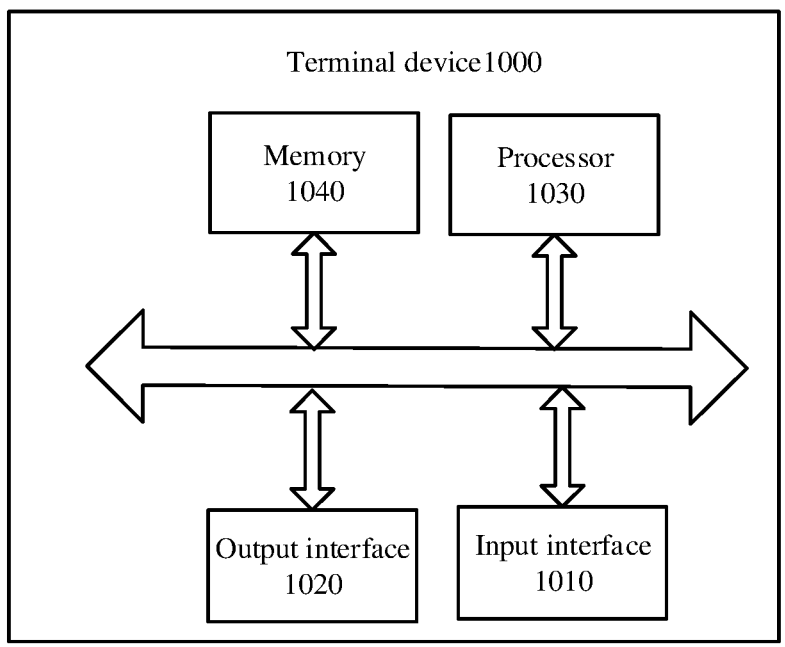
FIG. 10 is a schematic block diagram of a network device according to another embodiment of the disclosure.

As shown in FIG. 10, an embodiment of the disclosure also provides a terminal device 1000. The terminal device 1000 may be the terminal device 800 in FIG. 8, and may be configured to execute operations of the terminal device corresponding to the method 600 in FIG. 6. The terminal device 1000 includes an input interface 1010, an output interface 1020, a processor 1030 and a memory 1040. The input interface 1010, the output interface 1020, the processor 1030 and the memory 1040 may be connected through a bus system. The memory 1040 is configured to store programs, instructions or codes. The processor 1030 is configured to execute the programs, instructions or codes in the memory 1040 to control the input interface 1010 to receive a signal, control the output interface 1020 to send a signal and complete operations in the method embodiments.

It is to be understood that, in the embodiments of the disclosure, the processor 1030 may be a CPU and the processor 1030 may also be another universal processor, a DSP, an ASIC, an FPGA or another programmable logic device, discrete gate or transistor logic device and discrete hardware component and the like. The universal processor may be a microprocessor or the processor may also be any conventional processor and the like.

The memory 1040 may include a ROM and a RAM and provides instructions and data for the processor 1030. A part of the memory 1040 may further include a nonvolatile RAM. For example, the memory 1040 may further store information of a device type.

In an implementation process, each content of the method may be completed by an integrated logic circuit of hardware in the processor 1030 or an instruction in a software form. The contents of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 1040. The processor 1030 reads information in the memory 1040 and completes the contents of the method in combination with hardware. No more detailed descriptions will be made herein to avoid repetitions.

In a specific implementation mode, the determination module 820 of the terminal device 800 in FIG. 8 may be implemented by the processor 1030 in FIG. 10, and the communication module 810 of the terminal device 800 in FIG. 8 may be implemented by the input interface 1010 and output interface 1020 in FIG. 10.

An embodiment of the disclosure also discloses a computer-readable storage medium, which stores one or more programs, the one or more programs including instructions and the instructions, when being executed by a portable electronic device including multiple application programs, enables the portable electronic device to execute the method of the embodiment shown in FIG. 2 to FIG. 6.

An embodiment of the disclosure also discloses a computer program, which includes instructions, where the computer program, when being executed by a computer, enables the computer to execute corresponding flows in the method of the embodiment shown in FIG. 2 to FIG. 6.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. An information transmission method, applied to a communication system comprising a network device and a terminal device, wherein a frequency-domain resource on a carrier used by the communication system is a contention based frequency-domain resource, the method comprising:
  receiving, by the terminal device, first indication information from the network device in a first beamforming, wherein the first indication information is transmitted on a first time-frequency resource in a first downlink transmission burst;
  determining, by the terminal device according to the first indication information, that the first time-frequency resource is a downlink time-frequency resource;

determining, by the terminal device according to the first indication information, an ending position of the first downlink transmission burst;
receiving, by the terminal device, second indication information from the network device, wherein the second indication information is transmitted on a second time-frequency resource of the first downlink transmission burst; and
determining, by the terminal device according, to the second indication information, that the second dine-frequency resource is a downlink time-frequency resource,
wherein the first indication information comprises Downlink Control Information (DCI), and the first indication information is transmitted on the first time-frequency resource through a physical downlink control channel (PDCCH), and
wherein the second indication information is transmitted in a second beamforming, and the second time-frequency resource is later in time than the first time-frequency resource.

2. The method of claim 1, wherein the first indication information is further used by the terminal device to determine at least one of the following:
a starting position of the first downlink transmission burst,
a position of the first time-frequency resource in the first downlink transmission burst,
a number of remaining time units in the first downlink transmission burst,
an identity of a cell where the network device is located, or
a beam identity of the first beamforming.

3. The method of claim 1, further comprising:
determining, by the terminal device according to the first indication information, whether there is downlink transmission of the network device in the first time-frequency resource; or
determining, by the terminal device according to the first indication information, whether there is downlink transmission of the network device in the first downlink transmission burst.

4. The method of claim 1, wherein
the first beamforming is applied to a first time unit in the first downlink transmission burst; or,
the first beamforming is applied to an $m^{th}$ time unit of P time units in the first downlink transmission burst, wherein P represents a number of time units in the first downlink transmission burst, P being a positive integer and m being an odd number; or,
the first beamforming is applied to an $n^{th}$ time unit of the P time units in the first downlink transmission burst, wherein P represents the number of the time units in the first downlink transmission burst, P being a positive integer and n being an even number; or,
the first beamforming is applied to at least one time unit of first p time units in the first downlink transmission burst, p=ceil(P/2), wherein P represents the number of the time units in the first downlink transmission burst and ceil( ) representing rounding-up.

5. The method of claim 1, further comprising:
obtaining, by the terminal device, channel state information (CSI) of a downlink channel from the network device according to the ending position of the first downlink transmission burst and a channel state information-reference signal (CSI-RS).

6. A method for information transmission, applied to a communication system comprising a network device and a terminal device, wherein a frequency-domain resource on a carrier used by the communication system is a contention based frequency-domain resource, the method comprising:
determining, by the network device, an available first time-frequency resource in a first downlink transmission burst;
sending, by the network device, first indication information in a first beamforming to the terminal device on the first time-frequency resource, wherein the first indication information indicates that the first time-frequency resource is a downlink time-frequency resource, and indicates an ending position of the first downlink transmission burst;
determining, by the network device, an available second time-frequency resource in the first downlink transmission burst; and
sending, by the network device, second indication information on the second time-frequency resource of the first downlink transmission burst,
wherein the first indication information comprises Downlink Control Information (DCI), and the first indication information is transmitted on the first time-frequency resource through a physical downlink control channel (PDCCH), and
wherein the second indication information is transmitted in a second beamforming, and the second time-frequency resource is later in time than the first time-frequency resource.

7. The method of claim 6, wherein the first indication information further indicates at least one of the following:
a starting position of the first downlink transmission burst,
a position of the first time-frequency resource in the first downlink transmission burst,
a number of remaining time units in the first downlink transmission burst,
an identity of a cell where the network device is located, or
a beam identity of the first beamforming.

8. A terminal device in a communication system, wherein a frequency-domain resource on a carrier used by the communication system is a contention based frequency-domain resource, the terminal device comprising:
a communication interface, a processor and a memory for storing instructions executable by the processor, the input interface, the processor and the memory being connected through a bus system,
wherein, by executing the instructions, the processor is configured to:
control the communication interface to receive first indication information from a network device in a first beamforming, wherein the first indication information is transmitted on a first time-frequency resource m a first downlink transmission burst;
determine, according to the first indication information, that the first time-frequency resource is a downlink time-frequency resource;
determine, according to the first indication information, an ending position of the first downlink transmission burst;
control the communication interface to receive second indication information from the network device, wherein the second indication is transmitted on a second time-frequency resource of the first downlink transmission burst; and
determine, according to the second indication information that the second time-frequency resource is a downlink time-frequency resource, wherein the first indication information comprises Downlink Control information (DCI), and the first indication information is transmitted on the first time-frequency resource through a physical downlink control channel (PDCCH), and wherein the second indication information is transmitted in a second beamforming, and the second time-frequency resource is later in time than the first time-frequency resource.

9. The terminal device of claim 8, wherein the first indication information is further used to determine at least one of the following:
 a starting position of the first downlink transmission burst,
 a position of the first time-frequency resource in the first downlink transmission burst,
 a number of remaining time units in the first downlink transmission burst,
 an identity of a cell where the network device is located, or
 a beam identity of the first beamforming.

10. The terminal device of claim 8, wherein the processor is configured to:
 determine, according to the first indication information, whether there is downlink transmission of the network device in the first time-frequency resource; or
 determine, according to the first indication information, whether there is downlink transmission of the network device in the first downlink transmission burst.

11. The terminal device of claim 8, wherein
 the first beamforming is applied to a first time unit in the first downlink transmission burst; or,
 the first beamforming is applied to an $m^{th}$ time unit of P time units in the first downlink transmission burst, wherein P represents the number of the time units in the first downlink transmission burst, P being a positive integer and m being an odd number; or,
 the first beamforming is applied to an $n^{th}$ time unit of the P time units in the first downlink transmission burst, wherein P represents the number of the dine units in the first downlink transmission burst, P being a positive integer and n being an even number; or,
 the first beamforming is applied to at least one time unit of first p time units in the first downlink transmission burst, p=ceil(P/2), wherein P represents the number of the time units in the first downlink transmission burst and ceil( ) representing rounding-up.

12. The terminal device of claim 8, wherein the processor Is further configured to:
 obtain channel state information (CSI) of a downlink channel from the network device according to the ending position of the first downlink transmission burst and a channel state information-reference signal (CSI-RS).

13. A network device in a communication system, wherein a frequency-domain resource on a carrier used by the communication system is a contention based frequency-domain resource, the network device comprising:
 a communication interface, a processor and a memory for storing instructions executable by the processor, the output interface, the processor and the memory being connected through a bus system,
wherein, by executing the instructions, the processor is configured to:
 determine an available first time-frequency resource in a first downlink transmission burst;
 control the communication interface to send first indication information in a first beamforming to a terminal device on the first time-frequency resource, wherein the first indication information indicates that the first time-frequency resource is a downlink time-frequency resource, and indicates an ending position of the first downlink transmission burst;
 determine an available second time-frequency resource in the first downlink transmission burst; and
 control the communication interface to send second indication information on the second time-frequency resource of the first downlink transmission burst,
wherein the first indication information comprises Downlink Control Information (DCI), and the first indication information is transmitted on the first time-frequency resource through a physical downlink control channel (PDCCH), and
wherein the second indication information is transmitted in a second beamforming, and the second time-frequency resource is later in time than the first time-frequency resource.

14. The network device of claim 13, wherein first indication information further indicates at least one of the following:
 a starting position of the first downlink transmission burst,
 a position of the first time-frequency resource in the first downlink transmission burst,
 a number of remaining time units in the first downlink transmission burst,
 an identity of a cell where the network device is located, or
 a beam identity of the first beamforming.

* * * * *